UNITED STATES PATENT OFFICE.

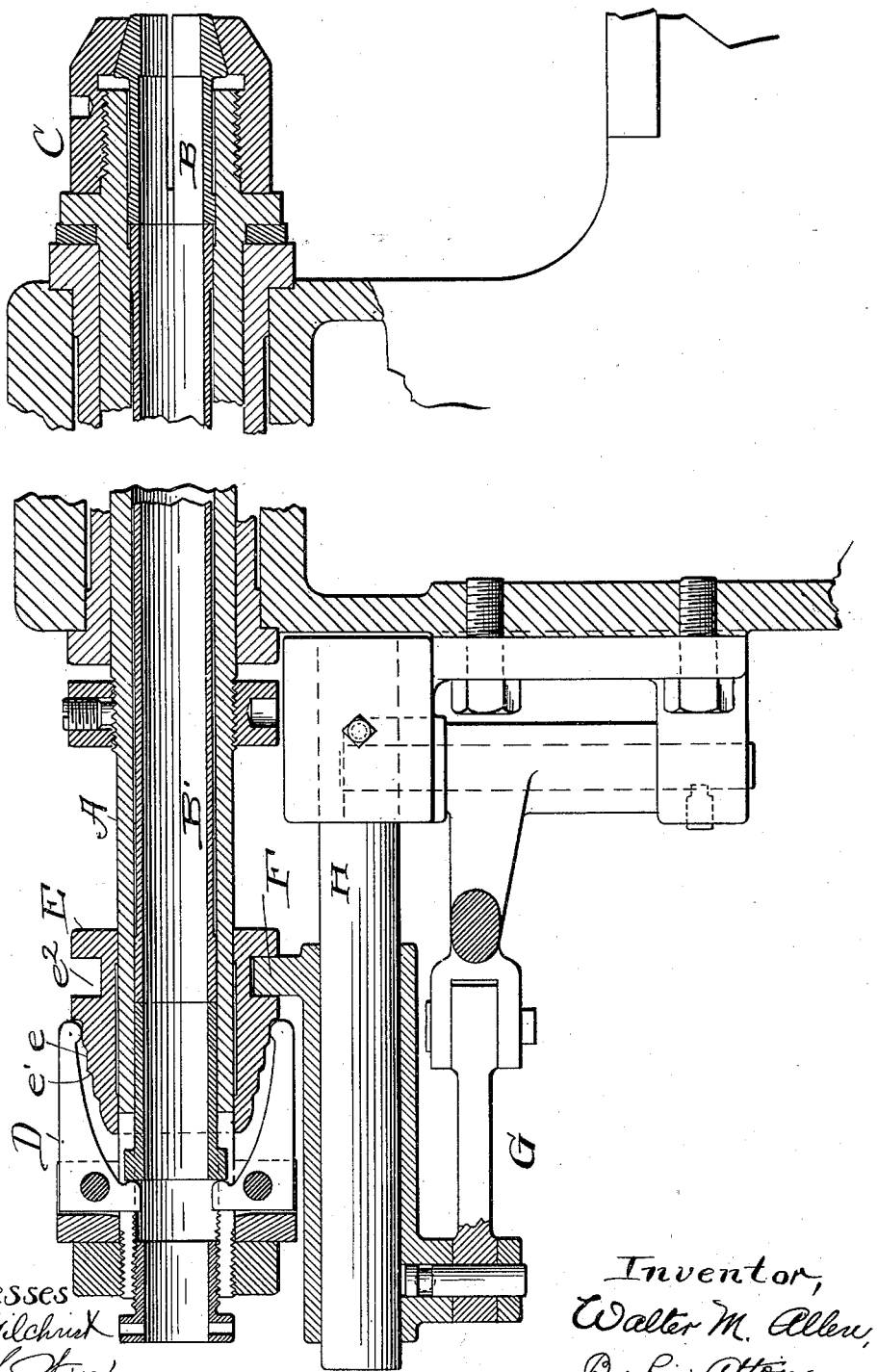

WALTER M. ALLEN, OF CLEVELAND, OHIO, ASSIGNOR TO THE WARNER & SWASEY COMPANY, OF CLEVELAND, OHIO, A CORPORATION OF OHIO.

CHUCK-OPERATING MECHANISM FOR LATHES.

SPECIFICATION forming part of Letters Patent No. 685,963, dated November 5, 1901.

Application filed May 17, 1901. Serial No. 60,629. (No model.)

*To all whom it may concern:*

Be it known that I, WALTER M. ALLEN, a citizen of the United States, residing at Cleveland, in the county of Cuyahoga and State of Ohio, have invented a certain new and useful Improvement in Chuck-Operating Mechanism for Lathes, of which the following is a full, clear, and exact description, reference being had to the accompanying drawing.

Certain kinds of lathes—for example, screw-machines and turret-lathes—employ tubular live-spindles through which the stock passes, and these spindles contain chucks for holding said stock. These chucks are commonly operated by a cone movable longitudinally upon the live-spindle. To close the chuck upon the stock, this cone is forced between the ends of levers, commonly called "fingers," and when the ends of these fingers engage with a substantially flat or more preferably cylindrical surface on said cone the chuck is locked. If the stock is rough or is not accurately drawn to a gage, frequent readjustment of the chuck is necessary, or otherwise the different pieces of the stock will not be held firmly. For some classes of operations other forms of holding devices than the ordinary chuck may be employed, the plunger operating to lock the work thereto. A similar objection holds as to these. In any event the devices have to be readjusted for every different size of stock, however small in variations it may be. This necessity for readjusting in machines of this character is objectionable on account of the time it takes.

The object of my invention is to provide a machine of the character described with novel operating mechanism which renders the holding device automatically adjustable to stock of various diameters within certain limits. The novel feature of the combination of parts constituting this invention is a stepped cone having alternate cylindrical and substantially conical surfaces whereby when said cone is forced between the ends of the operating-fingers the holding device will be locked. When said fingers are engaging with a cylindrical surface on the cone, they will be closed more or less, depending upon the diameter of the cylindrical surface on said cone with which they engage.

The drawing is a central longitudinal vertical section of the live-spindle of a lathe equipped with a chuck of familiar form and with the chuck-operating mechanism constituting my invention.

Referring to the parts by letters, A represents the rotary live-spindle; B, the longitudinally-movable sleeve, which is longitudinally slitted at its front end to form the contractible chuck-jaws. C represents the chuck-casing, which is provided with a tapered hole at its front end for engaging with the conical external surface of the front end of the sleeve B. B' represents the chuck-operating plunger, which is longitudinally movable in the live-spindle. D D represent the fingers for operating the plunger, and thereby moving the sleeve B in the direction which closes the chuck-jaws. These parts are of well-known construction.

E represents a cone which embraces the live-spindle and is capable of sliding longitudinally thereon. F represents the fork, which engages in the annular groove $e^2$ of said cone, whereby to move the same upon said spindle. This fork is attached to a sleeve capable of sliding upon a fixed rod H, which sleeve is caused to so slide by the operation of the toggle G. The specific mechanism described for moving the cone upon the spindle is not essential to the invention.

The cone E is different from the cones ordinarily used in that its surface is made up of alternate flat surfaces $e$ and inclined surfaces $e'$, or perhaps more accurately of cylindrical surfaces $e$ and substantially conical surfaces $e'$. When the cone is being moved to the right, as shown in the drawing, and one of the conical surfaces $e'$ is engaging with the fingers, the chuck is being closed. If the movement of the cone should be stopped when the fingers were so engaging with a conical surface thereon, the chuck would not be locked. The pressure of the fingers on said conical surfaces would force the cone backward and permit an opening of the chuck. When the fingers are engaging with any one of the cylindrical surfaces on the cone, the chuck is locked and said chuck is closed to a greater or less extent, depending upon the diameter of the particular cylindrical surface with which the fingers so engage. The inclination of the conical surfaces $e'$ is such that the fingers will readily ride up said conical surfaces from one of said cylindrical surfaces to the next one. If, therefore, the stock is rough or is not drawn exactly to gage, the chuck-jaws may be caused to firmly grasp said stock by moving the cone a greater or less distance, as required. Indeed, no readjusting of the chuck is necessary in order that it may be capable of firmly grasping the stock, which is not intended to be of the same gage, but which varies in diameter within the small limits.

Having described my invention, I claim—

In a lathe, the combination of the live-spindle, a chuck therein, a longitudinally-movable plunger, and pivoted fingers for moving the plunger and thereby closing the chuck, with a longitudinally-movable cone characterized by having its external surface made up alternately of cylindrical and substantially conical portions, substantially as and for the purpose specified.

In testimony whereof I hereunto affix my signature in the presence of two witnesses.

WALTER M. ALLEN.

Witnesses:
ALBERT H. BATES,
H. M. WISE.